United States Patent [19]
Jacobs et al.

[11] Patent Number: 5,784,269
[45] Date of Patent: Jul. 21, 1998

[54] THREE PHASE HIGH POWER FACTOR CONVERTER USING PHASE SELECTION CIRCUIT

[75] Inventors: Mark E. Jacobs, Dallas; Yimin Jiang, Plano, both of Tex.

[73] Assignee: Lucent Technologies, Inc., Murray Hill, N.J.

[21] Appl. No.: 804,313

[22] Filed: Feb. 21, 1997

[51] Int. Cl.[6] ............................................. H02H 7/122
[52] U.S. Cl. ................................................. 363/89
[58] Field of Search .......................... 363/56, 132, 20, 363/21, 124, 162, 160, 28–30, 40–45

[56] References Cited

U.S. PATENT DOCUMENTS

5,576,943  11/1996  Keir ............................................. 363/56

*Primary Examiner*—Aditya Krishnan

[57] ABSTRACT

For use in a DC/DC converter fed by a three phase rectifier, an active circuit and method for delivering an inner phase of three phase AC input power provided to the rectifier and a power converter employing the active circuit or the method. The active circuit includes: (1) a phase selection switching circuit, coupled to the rectifier, that selects an inner phase of the three phase AC input power and (2) a switching network, coupled to the phase selection switching circuit, that controls a waveshape of at least the inner phase to the DC/DC converter thereby to reduce harmonics associated with the three phase AC input power.

20 Claims, 14 Drawing Sheets

THREE PHASE HIGH POWER FACTOR CONVERTER USING PHASE SELECTION CIRCUIT

TECHNICAL FIELD OF THE INVENTION

The present invention is directed, in general, to power conversion and, more specifically, to a three phase rectifier that uses a six diode bridge, a DC/DC converter, and an auxiliary active circuit that controls the waveshape of the current of an inner phase.

BACKGROUND OF THE INVENTION

Power converters that convert three-phase AC input power to one or more DC power levels are widely known. The prior art power converters include high-power boost converters that output DC voltage levels that are higher than the peak of the AC input supply voltage and buck converters that output DC voltage levels that are less than the peak of the AC input supply voltage.

Figure 1A:
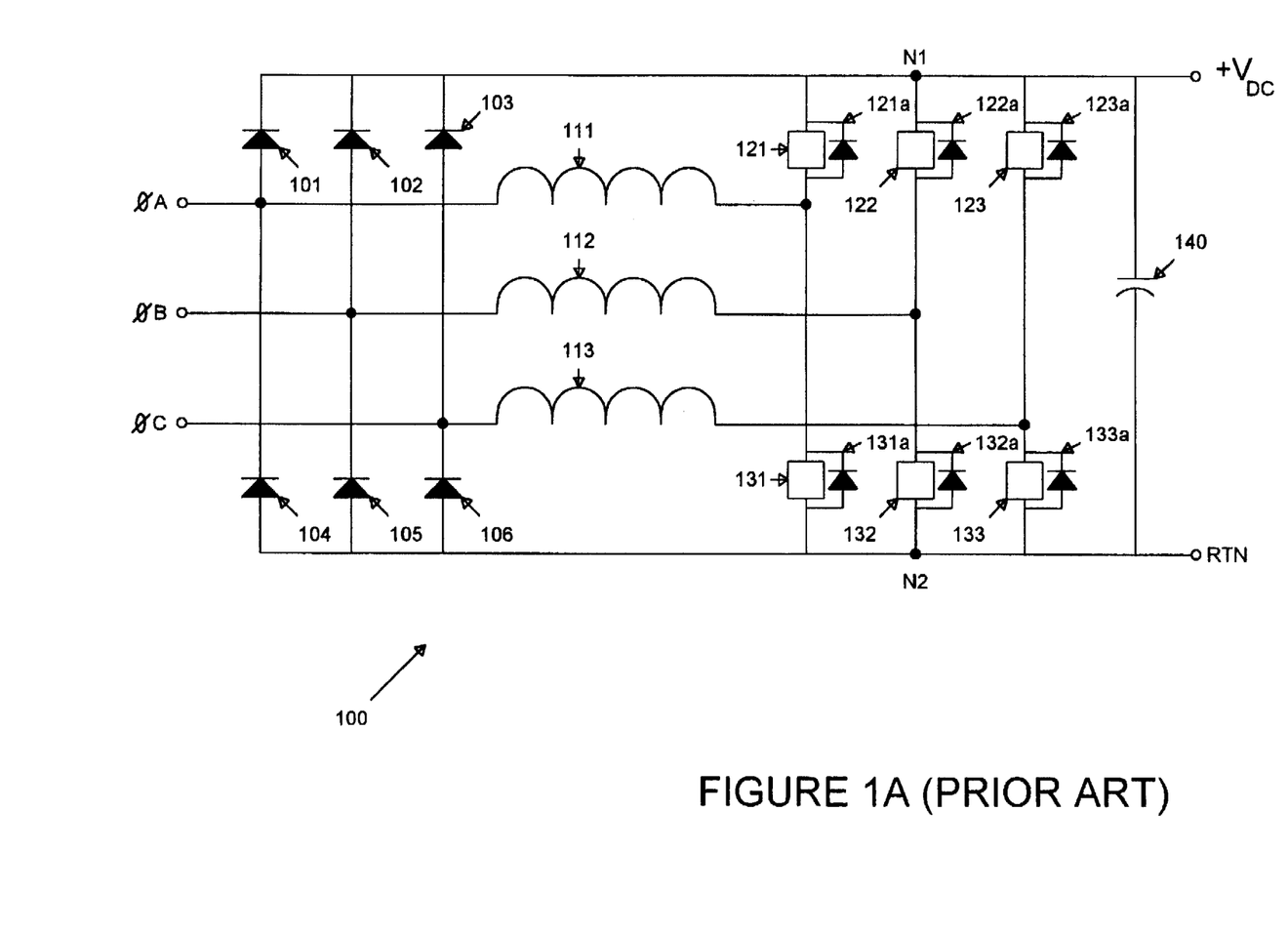
FIG. 1A illustrates a boost converter in accordance with the prior art.

FIG. 1A illustrates boost converter 100 in accordance with the prior art. Those skilled in the art will recognize that boost converter 100 is a six-switch three-phase converter to the three input phases, φA, φB and φC. The operation of prior art boost converter 100 is well known, but will be discussed briefly so that the following discussion of the present invention may be more readily understood.

The input stage of boost converter 100 comprises surge protection diodes 101–106, which clip large transient voltages on the three input lines. Diodes 101–106 do not perform any other significant function in the operation of boost converter 100 and need not be discussed further. Current flows into and out of boost converter 100 through inductors 111–113. Switches 121–123 and 131–133 are high speed switches that selectively connect each of the input phases to nodes N1 and N2 on either side of capacitor 140.

The operation of boost converter 100 may best be explained by the exemplary situation where φA is the most positive voltage and φC is the most negative voltage, i.e., $V_A > 0 > V_B > V_C$. Current flows into the φA input, through inductor 111 and diode 121a, and onto capacitor 140. The circuit is completed by the rapid opening and closing (i.e., high-speed pulsing) of switches 122 and 123 at a rate of, for example, 50 KHz. Under normal operation, the voltage on capacitor 140 is larger than the peak differences between the AC inputs.

When switches 122 and 123 are closed, the current levels in inductors 111–113 ramp up continuously. When switches 122 and 123 are opened, the currents in inductor 111–113 store energy on capacitor 140, thereby maintaining the voltage level on capacitor 140. The currents in inductors 111–113 decrease (ramp down) while the current is being stored on capacitor 140. The voltage on capacitor 140 is sensed and a feedback circuit (not shown) indirectly adjusts the width of the pulses used to open and close switches 122 and 123. If the voltage level on capacitor 140 is too low, the pulse width is increased, so that switches 122 and 123 are closed for a longer period of time. This causes the currents in inductors 111–113 to ramp up to a higher level right before switches 122 and 123 are reopened. This higher current level stores a greater amount of charge on capacitor 140 when switches 122 and 123 are open, thereby raising the voltage on capacitor 140.

Conversely, if the voltage level on capacitor 140 is too high, the pulse width is decreased, so that switches 122 and 123 are closed for a shorter period of time. This allows the currents in inductors 111–113 to ramp up only to relatively smaller peak levels right before switches 122 and 123 are reopened. This relatively lower current level stores a smaller amount of charge on capacitor 140 before switches 122 and 123 are reopened, thereby lowering the voltage on capacitor 140.

When φB or φC becomes the highest voltage level, the operation of boost converter 100 is virtually identical to that described above, except that different switch combinations are used to connect the three input phases to capacitor 140.

Figure 1B:
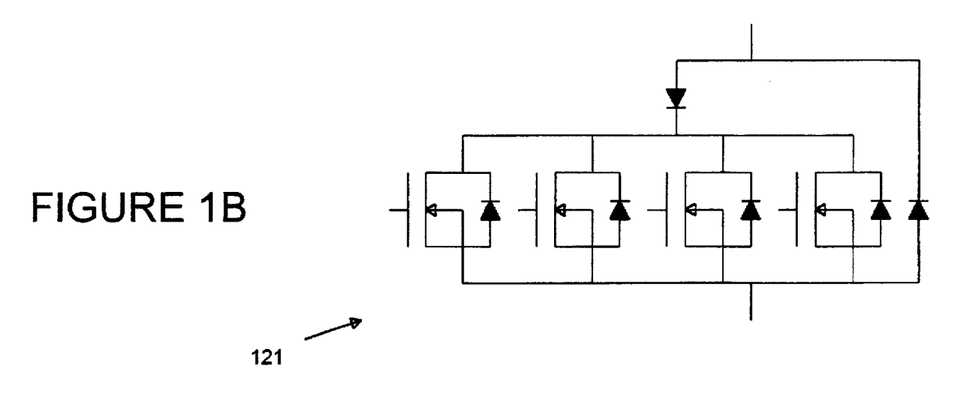
FIGS. 1B and 1C illustrate in greater detail exemplary embodiments of the unidirectional switches that may be used in the prior art boost converter of FIG. 1A for high power applications.
Figure 1C:
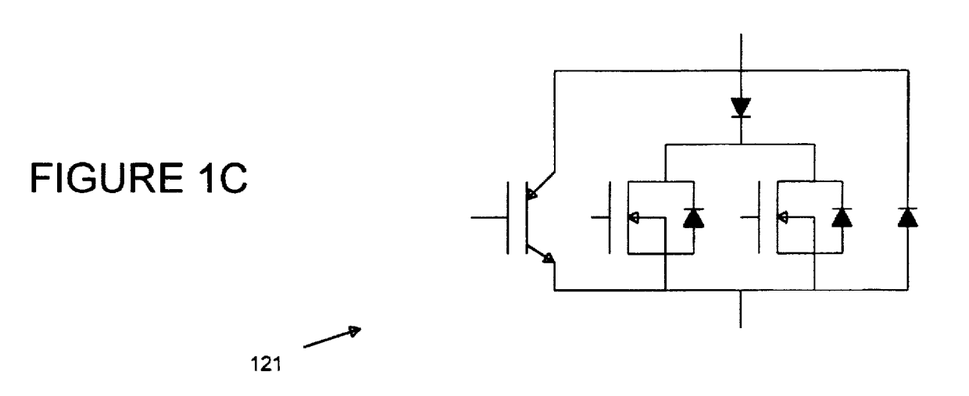

FIGS. 1B and 1C illustrate in greater detail exemplary embodiments of unidirectional switches 121–123 and 131–133 that may be used in prior art boost converter 100 for high power applications that need multiple parallel switches in order to carry high current loads. FIG. 1B illustrates a MOSFET switch 121. FIG. 1C illustrates combined MOSFET and insulated gate bipolar transistor (IGBT) switch 121. Switch 121 is depicted in FIGS. 1B and 1C with a diode in parallel on the right side of the switch. The parallel diode is representative of diodes 121a–123a and 131a–133a in FIG. 1A.

Boost converter 100 has numerous shortcomings. Of the six active switches 121–123 and 131–133 in the circuit, only two operate at any one time. This is an inefficient utilization of the semiconductor devices. The six diodes must be fast recovery type diodes and each needs a snubber. The control for the switches is very complicated and interleaving pulse-width modulation operations of two or more prior art boost converters in order to reduce output ripple requires a high component count. Finally, boost converter 100 generates a large amount of EMI noise.

Accordingly, what is needed in the art is an improved boost converter that uses its component semiconductor switches more efficiently by processing most of the principal power in a minimum number of switches. There is a still further need in the art for a boost converter that has reduced output ripple. There is also a need in the art for a boost converter that has relatively low EMI noise, particularly with respect to equipment ground during highspeed switching.

SUMMARY OF THE INVENTION

To address the above-discussed deficiencies of the prior art, the present invention provides, for use in a DC/DC converter fed by a three phase rectifier, an active circuit and method for controlling an inner phase of three phase AC input power provided to the rectifier and a power converter employing the active circuit or the method. The active circuit includes: (1) a phase selection switching circuit, coupled to the rectifier, that selects an inner phase of the three phase AC input power and (2) a switching network, coupled to the phase selection switching circuit, that delivers the inner phase to the DC/DC converter thereby to reduce harmonics associated with the three phase AC input power.

For purposes of the present invention, "inner phase" is defined as the phase that is between the two extreme phases or the phase that is closest to zero. Those skilled in the art understand that, in three phase electric power at any given moment, one phase is at a highest voltage and another phase is at a lowest voltage. The remaining phase is at some intermediate voltage; this remaining phase is the "inner phase" as used herein.

The present invention therefore recognizes that harmonics in the input of the converter can be reduced if the inner phase is tapped and delivered to the DC/DC converter.

In one embodiment of the present invention, the DC/DC converter is embodied in first and second interleaved portions, the switching network delivering the inner phase to at least one of the first and second interleaved portions. In a variation of the above, the switching network delivers the inner phase to both the first and second interleaved portions.

In one embodiment of the present invention, the switching network comprises at least two active switches, the at least two active switches acting as switches within the DC/DC converter. Thus, switching required to be performed within the switching network and the DC/DC converter can be integrated into a single set of active switches. Of course, the present invention fully contemplates separate switches for the switching network and the DC/DC converter.

In one embodiment of the present invention, the three phase rectifier comprises a duality of diodes for each phase of the three phase AC input power. Those skilled in the art will recognize that the present invention is advantageously operable with a three phase, six diode rectifier.

In one embodiment of the present invention, the phase selection switching circuit comprises an inductor that delivers the inner phase to the DC/DC converter. In the embodiments to be illustrated and described, the operation of the inductor will be detailed.

In one embodiment of the present invention, the phase selection switching circuit is synchronized to the three phase AC input power. This advantageously allows selection of the inner phase and synchronizes operation of the phase selection switching circuit and the DC/DC converter.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 2A:
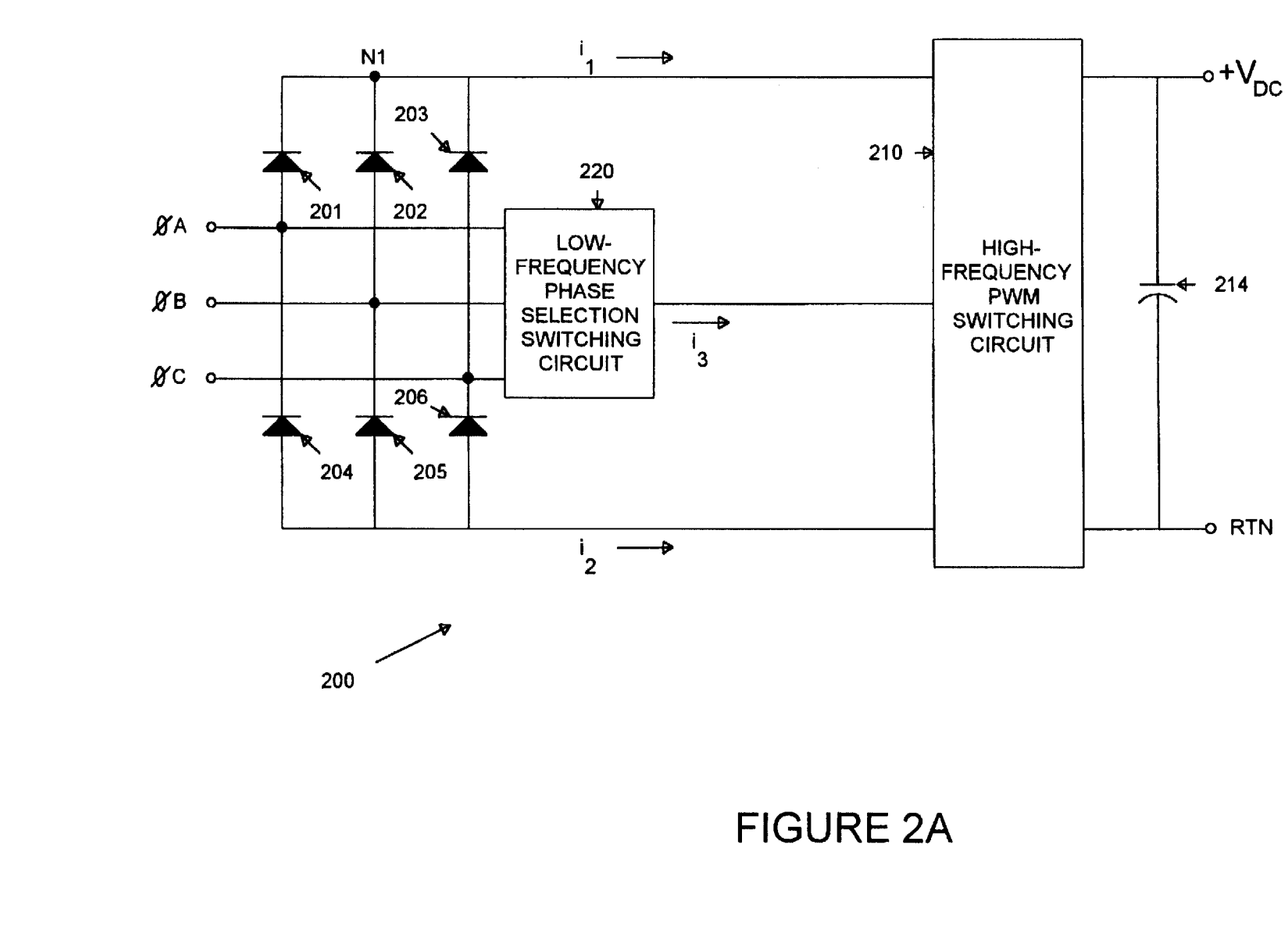
FIG. 2A illustrates a power converter according to a first embodiment of the present invention.

FIG. 2A illustrates power converter 200 according to a first embodiment of the present invention. Power converter 200 includes a three-phase input rectifier stage, comprising diodes 201–206, that feeds high-frequency pulse width modulation (PWM) switching circuit 210. Switching circuit 210 receives currents $i_1$ and $i_2$ from the most positive and most negative phases, respectively, of the rectifier stage and stores energy on storage capacitor 214, thereby generating the DC output, $+V_{DC}$. Power converter 200 also comprises low-frequency phase selection switching circuit 220, which returns current $i_3$ to the phase closest to neutral. High-frequency pulse-width modulation circuit 210 controls and shapes current $i_3$ and at least one, and possibly both, of currents $i_1$ and $i_2$, thereby minimizing total harmonic distortion (THD) in power converter 210. High-frequency PWM circuit 210 causes currents $i_1$, $i_2$ and $i_3$ to have sinusoidal waveshapes.

Figure 2B:
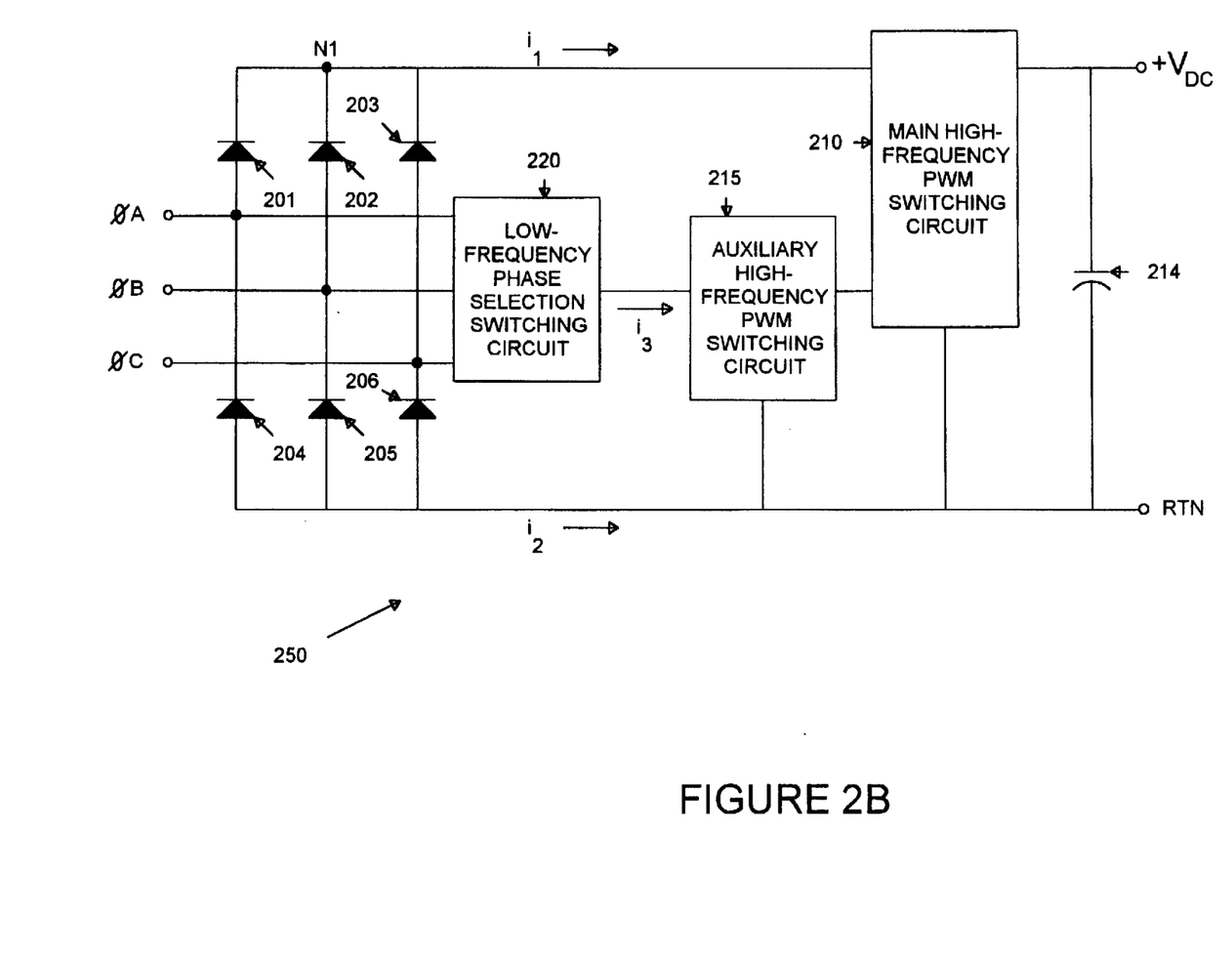
FIG. 2B illustrates a power converter according to a second embodiment of the present invention.

FIG. 2B illustrates power converter 250 according to a second embodiment of the present invention. Like the converter in FIG. 2A, power converter 250 includes a three-phase input rectifier stage, comprising diodes 201–206, that feeds main high-frequency PWM switching circuit 210. Switching circuit 210 stores energy on storage capacitor 214, thereby generating the DC output, $+V_{DC}$. Power converter 250 also comprises auxiliary high-frequency PWM switching circuit 215 (the "switching network") and low-frequency phase selection switching circuit 220 (the "phase selection switching circuit").

The majority of power in converter 250 is processed in main high-frequency PWM switching circuit 210, which generally receives currents $i_1$ and $i_2$ from the most positive and most negative phases, respectively. However, auxiliary high-frequency PWM switching circuit 215 and phase selection switching circuit 220 are used to return current $i_3$ to the phase closest to neutral and to shape the current waveforms, thereby maintaining unity power factor for power converter 250. Auxiliary high-frequency PWM switching circuit 215 controls and shapes current $i_3$ and at least one, and possibly both, of currents $i_1$ and $i_2$, thereby minimizing total harmonic distortion (THD) in power converter 210. Auxiliary high-frequency PWM circuit 215 causes currents $i_1$, $i_2$ and $i_3$ to have sinusoidal waveshapes. The following figures illustrate more detailed embodiments and other variations of power converters 200 and 250 in order to more specifically describe the operation of the present invention.

Figure 3:
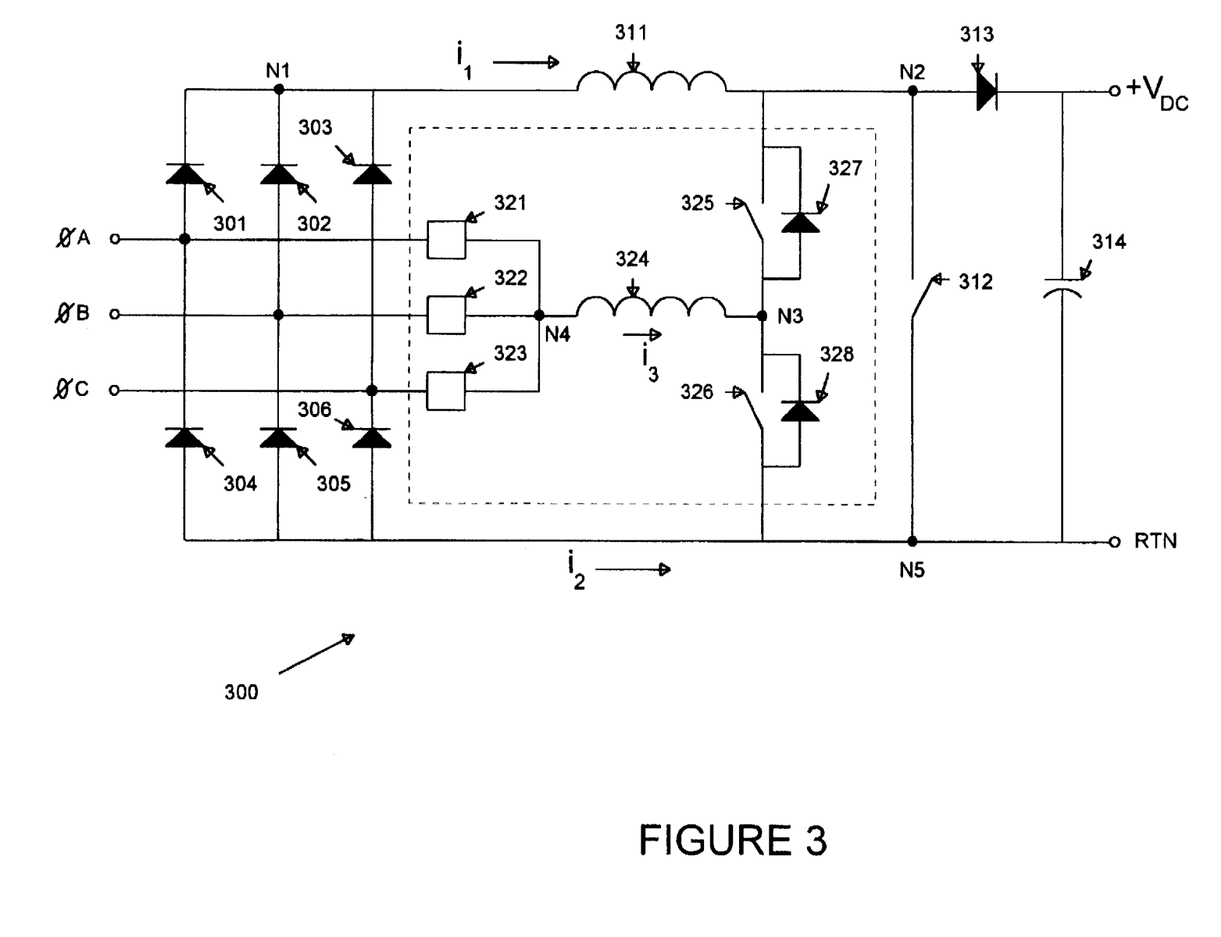
FIG. 3 illustrates a boost converter according to a third embodiment of the present invention.

FIG. 3 illustrates boost converter 300 according to a third embodiment of the present invention. Those skilled in the art will recognize that, without the circuit components inside the dotted line, boost converter 300 is simply a DC/DC boost converter fed by a three-phase, six-diode rectifier, which is one of the simplest and best known three-phase boost converters. Boost converter 300 outputs a DC voltage level, $+V_{DC}$, that is greater than the peak-to-peak amplitude between the three phases of the AC input supply.

The input stage of boost converter 300 comprises low-frequency diodes 301–306, which are coupled to the three input power phases, φA, φB and φC. As will be explained in greater detail below, the boost stage employs high-frequency pulse width modulation ("PWM") switching of switch 312 to draw current through inductor 311 and store the energy onto large storage capacitor 314. Diodes 301–306 form an input rectifier, so that the voltage at node N1 always follows the most positive voltage phase. For example, when φA is the most positive voltage and φC is the most negative voltage, node N1 follows φA and node N5 follows φC.

Switch 312 is opened and closed (i.e., pulsed) at high frequency, for example, 50 KHz. When switch 312 is closed, the current level in inductor 311 ramps up continuously. When switch 312 is opened, the current in inductor 311, which cannot turn off instantly, is diverted through fast recovery diode 313 and flows onto capacitor 314. The current in inductor 311 decreases (ramps down) while the current is being stored on capacitor 314.

The voltage on capacitor 314 is sensed and a feedback circuit (not shown) indirectly adjusts the width of the pulses used to open and close switch 312. If the voltage level on capacitor 314 is too low, the pulse width is increased, so that switch 312 is closed for a longer period of time. This causes the current in inductor 311 to ramp up to a higher level right before switch 314 is reopened. This higher current level stores a greater amount of charge on capacitor 314 when switch 312 is open, thereby raising the voltage on capacitor 314.

Conversely, if the voltage level on capacitor 314 is too high, the pulse width is decreased, so that switch 312 is closed for a shorter period of time. This allows the current in inductor 311 to ramp up only to a relatively smaller peak level right before switch 312 is reopened. This relatively lower current level stores a smaller amount of charge on capacitor 314 when switch 312 is open, thereby lowering the voltage on capacitor 314.

In this way, pulse-width modulation is used to vary the duty cycle of switch 312 and thereby control the voltage level on capacitor 314 as the current drain caused by a load attached to capacitor 314 changes. At equilibrium, the amount of charge stored on capacitor 314 when switch 312 is open is equal to the amount of charge drained from capacitor 314 by a load when switch 312 is closed and diode 313 is reversed biased.

Inductor 311, diode 313 and switch 312 correspond to main high-frequency PWM switching circuit 210 in FIG. 2B. However, without the circuitry shown inside the dotted lines in FIG. 3, each input phase current of boost converter 300 would contain substantial harmonics of the AC line frequency. By adding the components inside the dotted line, the boost converter of the present invention maintains the three phase currents, $i_1$, $i_2$ and $i_3$, as sinusoidal waveforms, so that the resultant total harmonic distortion (THD) is very low. This is accomplished by controlling and shaping current $i_3$ and at least one, and possibly both, of currents $i_1$ and $i_2$. Advantageously, switches 321–323, switch 325, switch 326, and inductor 324 consume much less power than the main boost components (inductor 311, switch 312, diode 313), are smaller in size, and produce only a relatively small amount of heat. Switches 321–323, which are bi-directional, correspond to low-frequency phase selection switching circuit 220 in FIG. 2B and connect inductor 324 to the phase closest to neutral. Switches 325 and 326, diodes 327 and 328, and inductor 324 correspond to auxiliary high-frequency PWM switching circuit 215 in FIG. 2B and are responsible for controlling and shaping the waveform of the returned current $i_3$.

Figure 4:
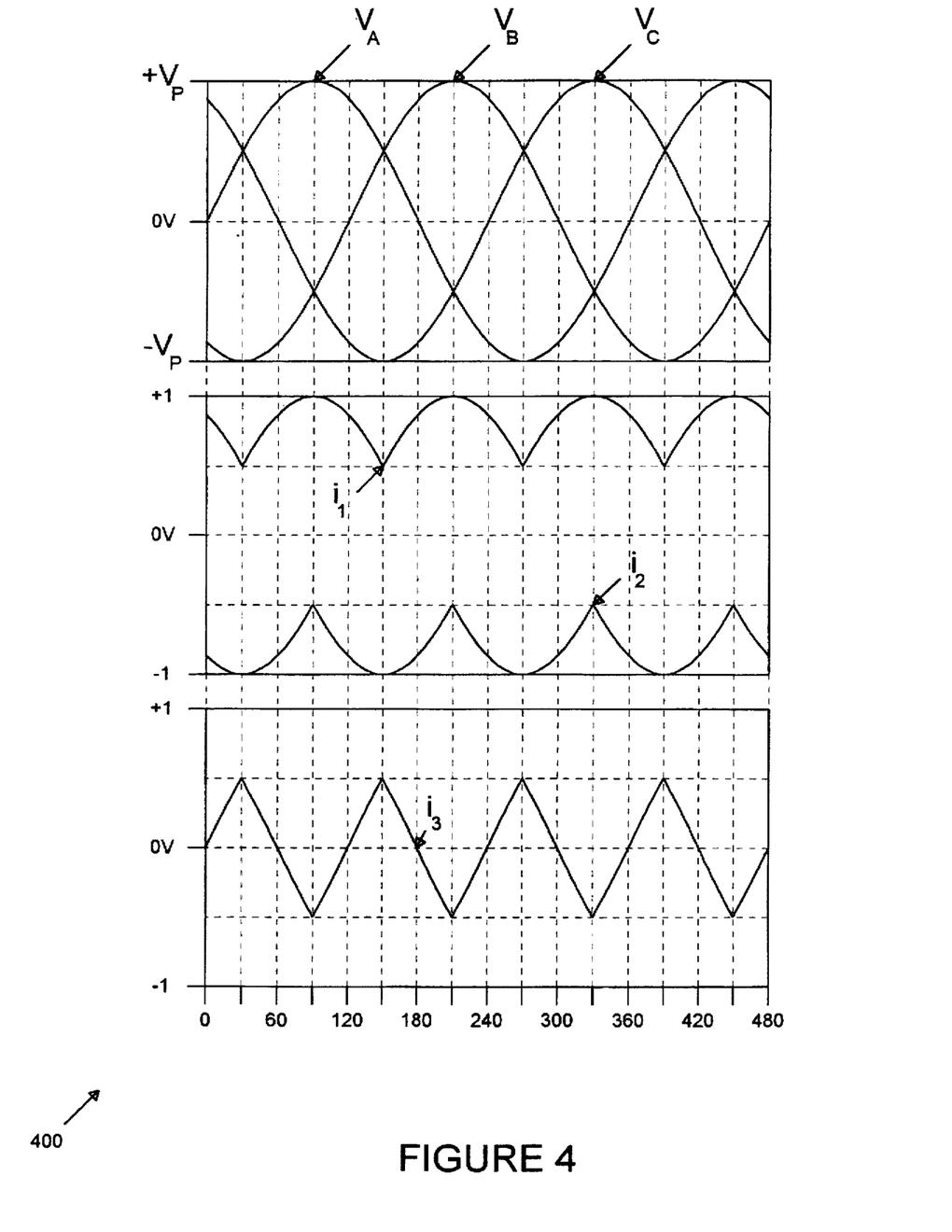
FIG. 4 illustrates the timing relationship between the three phases of the input power supply and selected currents in the boost converter of FIG. 3.

FIG. 4 illustrates the timing relationship between the three phases of the input power supply and selected currents in boost converter 300. The three phase voltages, $V_A$, $V_B$ and $V_C$, which have peak values of $\pm V_P$, are shown in the top graph. Under unity power factor operation, the current, $i_1$, in inductor 311 follows the shape of the most positive phase voltage (referenced to neutral). The return current $i_2$ follows the shape of the most negative phase voltage (referenced to neutral). The current $i_3$ in inductor 324 follows the middle waveform between currents $i_1$ and $i_2$. Inductor 324 is switched every 60° of a line cycle to a different input phase by low-frequency switches 321, 322 and 323 so that inductor 324 is always connected to the phase closest to the neutral. For example, switch 323 is closed from 30° to 90° in FIG. 4 to connect inductor 324 to φC, switch 322 is closed from 90° to 150° to connect inductor 324 to φB, and switch 321 is closed from 150° to 210° to connect inductor 324 to φA.

The method by which switch 312 and switches 325 and 326 control currents $i_1$, $i_2$ and $i_3$ is best explained by the following two examples, which essentially cover all possible input voltage states, namely, two phases greater than zero volts and two phases less than zero volts. The voltage levels on the three phase inputs are sensed and feedback circuits (not shown) open and close low-frequency switches 321–323 and pulse width modulation switches 312, 325 and 326 according to the algorithms described below.

$$V_A > V_B > 0 > V_C \qquad \qquad 1)$$

From 120° to 150° in FIG. 4, φA voltage is greater than φB voltage, both φA and φB voltages are greater than zero, and φC voltage is less than zero volts. At that point switch 322 is closed, current $i_1$=φA current, current $i_2$=φC current and current $i_3$=φB current, which is greater than zero. Since two of the three currents ($i_1$, $i_2$ and $i_3$) are independent, only two currents need to be controlled in order to fully control all three currents.

For the purpose of controlling current $i_1$, the voltage at node N2 in FIG. 3 should be a pulse width modulated waveform with a proper duty-cycle that makes the average of the pulse width modulated waveform equal to the voltage of $V_A - V_C$. For the purpose of controlling current $i_3$, the voltage at node N3 in FIG. 3 should be a waveform with a proper duty-cycle that makes the average of the pulse width modulated waveform equal to the voltage of $V_B - V_C$. Since $V_B - V_C$ is smaller than $V_A - V_C$, the zero voltage level portion of the voltage waveform at node N3 should be longer than that at node N2.

Figure 5:
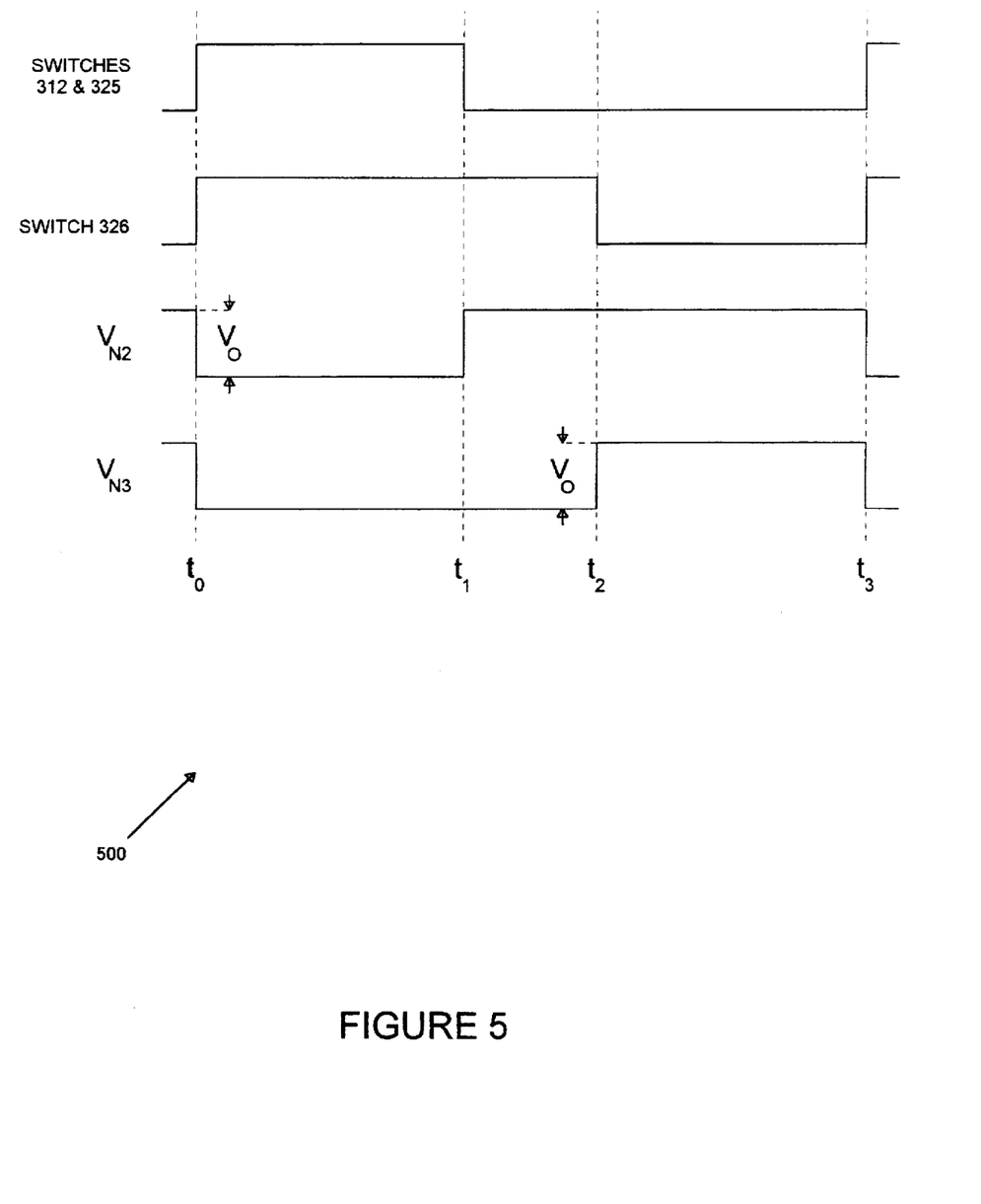
FIG. 5 illustrates the timing relationship of selected switches in the boost converter of FIG. 3 under the input phase voltage conditions: $V_A > V_B > 0 > V_C$.

FIG. 5 illustrates the timing relationship of selected signals in boost converter 300 under the input phase voltage conditions: $V_A > V_B > 0 > V_C$. The upper two waveforms are drive signals for switches 312, 325 and 326. The lower two waveforms are the voltages at node N2 and node N3 with reference to DC ground. Assuming synchronized turn-on, all three switches are closed at $t_0$, the beginning of a switching cycle, bringing node N2 and node N3 down to DC ground potential. When switch 312 and switch 325 are opened at $t_1$, node N2 moves up to the output potential, but node N3 stays at the DC ground because current $i_3 > 0$ and switch 326 is still closed. At time $t_2$ when switch 326 is opened, current $i_3$ flows through diode 327 and node N3 becomes high.

Although theoretically switch 325 does not have to be switched in order for the circuit to operate properly, closing switch 325 when switch 312 is closed helps reduce losses. Since inductor 324 is always connected to a phase with a lower voltage level than the phase to which inductor 311 is connected, the average value of $V_{N3}$ will always be smaller than the average value of $V_{N2}$, so the switch controlling the current in inductor 324 always needs a longer "closed" period within a switching cycle than switch 312.

$$V_A > 0 > V_B > V_C \qquad 2)$$

From 90° to 120° in FIG. 4, $\phi$A voltage is greater than zero, $\phi$B voltage is greater than $\phi$C voltage, and both $\phi$B and $\phi$C voltages are less than zero. At that point switch 322 is closed, $i_1 = \phi A$ current, $i_2 = \phi C$ current, and $i_3 = \phi B$ current, which is less than zero.

Figure 6:
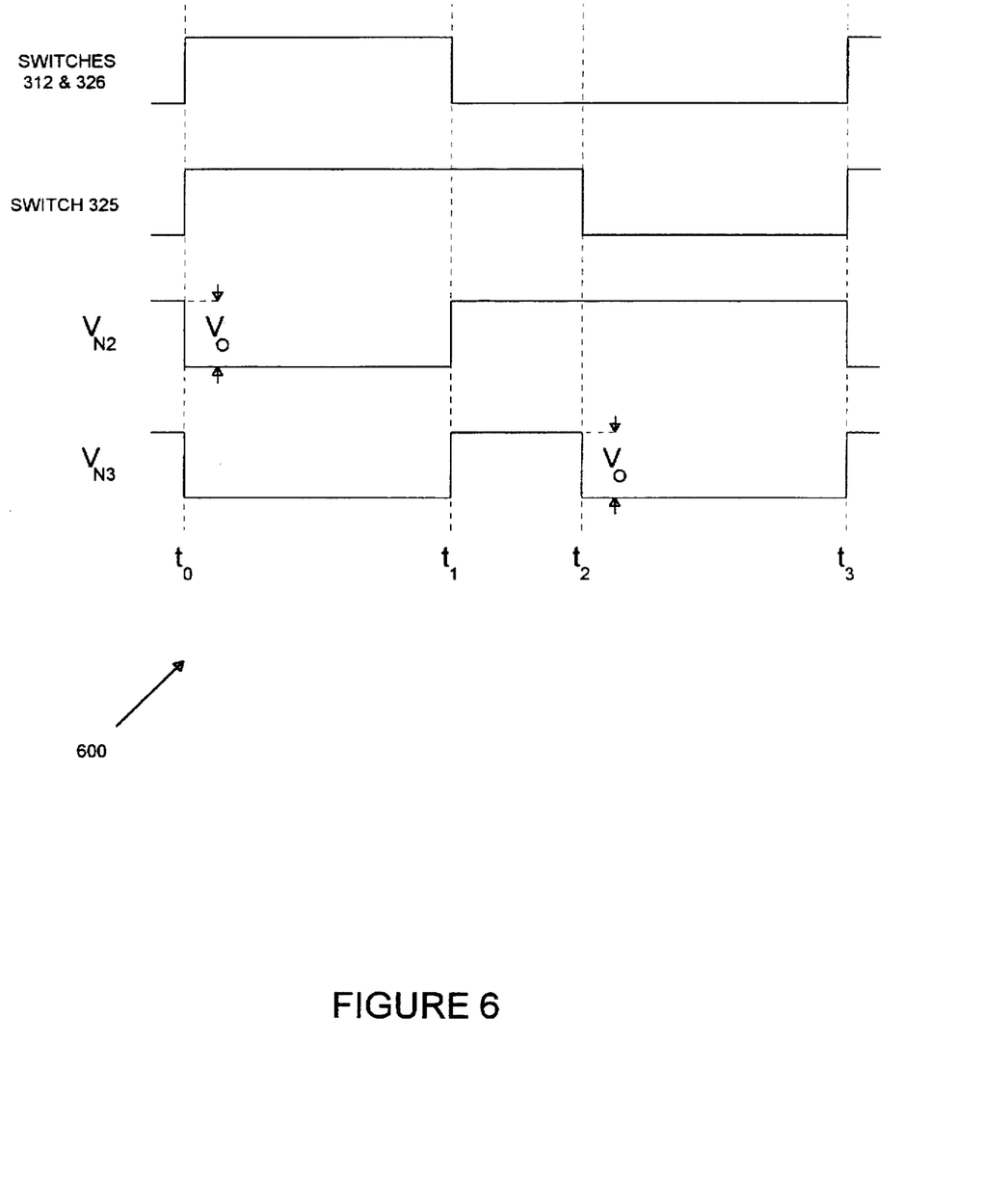
FIG. 6 illustrates the timing relationship of selected switches in the boost converter of FIG. 3 under the input phase voltage conditions: $V_A > 0 > V_B > V_C$.

FIG. 6 illustrates the timing relationship of selected switches in boost converter 300 under the input phase voltage conditions: $V_A > 0 > V_B > V_C$. Since current $i_3 < 0$, the voltage on node N3 goes up to the level on node N2 when switches 312 and 326 are opened at $t_1$. When switch 325 is opened at $t_2$, current $i_3$ flows through diode 328 and brings node N3 down to the DC ground.

Since only one of switches 321–323 conducts at any one time, there may be short dead spaces when all three switches are open during switching transients. To compensate, capacitors or small diodes (not shown) may be coupled from node N4 to node N1 and from node N4 to node N5 in FIG. 3 to provide current paths for the current in inductor 324 when all three switches are open. Additionally, diodes 301–306 are slow recovery line frequency rectifiers and require the necessary surge current capability to accommodate expected AC line surges. Diode 313 is a fast switching diode and should also have the required surge current capability. A snubber circuit or soft-switching may be used to compensate for the reverse recovery of diode 313. It should also be noted that switch 312 in FIG. 3 is not necessary to the operation of boost converter 300, since its function may be performed by the series combination of switches 325 and 326. However for most three-phase applications, the power levels are high enough to justify using switch 312 to achieve a better conversion efficiency.

Figure 7:
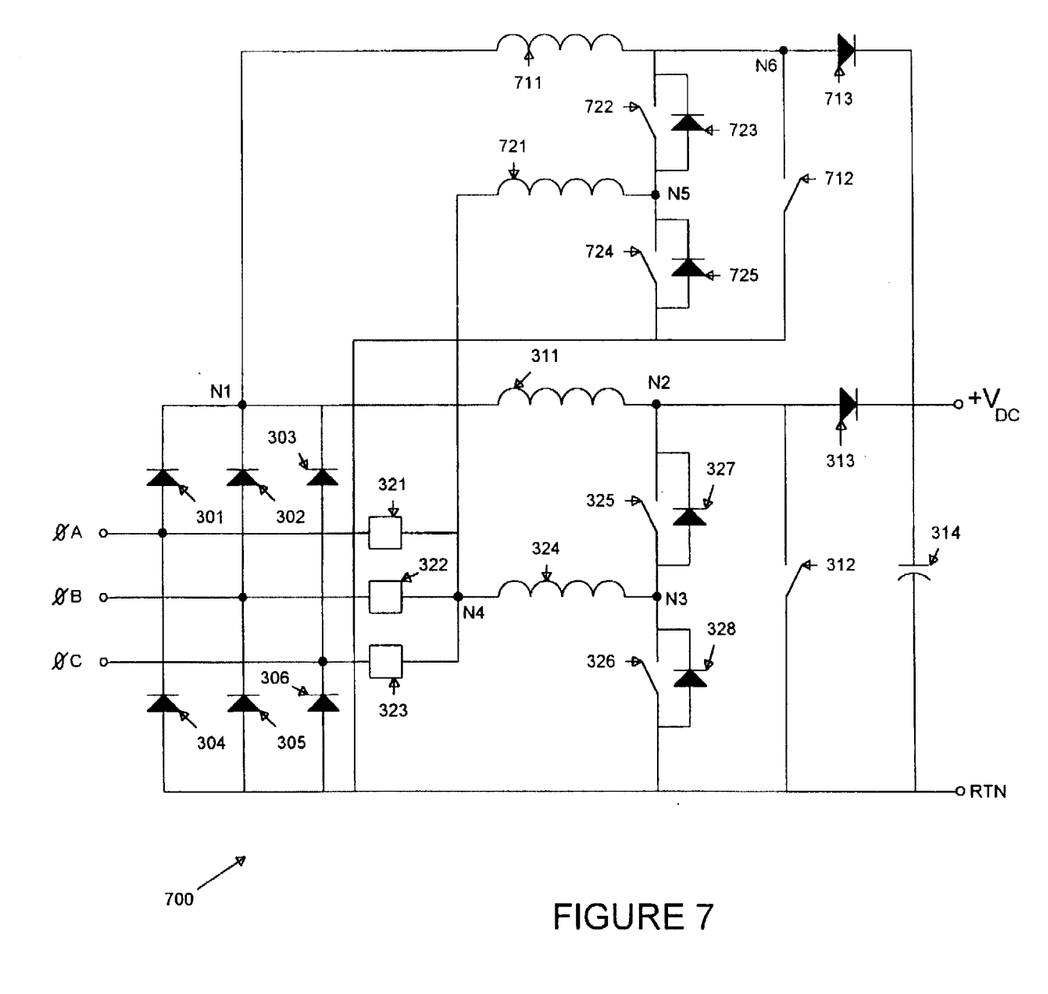
FIG. 7 illustrates an interleaved boost converter according to a fourth embodiment of the present invention.

FIG. 7 illustrates interleaved boost converter 700 according to a fourth embodiment of the present invention. A second boost converter is formed by inductors 711 and 721, switches 722, 724 and 712, and diodes 713, 723 and 725. This second boost converter delivers current to capacitor 314 in parallel with the first boost converter formed by the components in FIG. 3. Switching is synchronized between the two boost converters in order to interleave the delivery of current to capacitor 314. Interleaving can greatly reduce the ripple current in capacitor 314.

Figure 8:
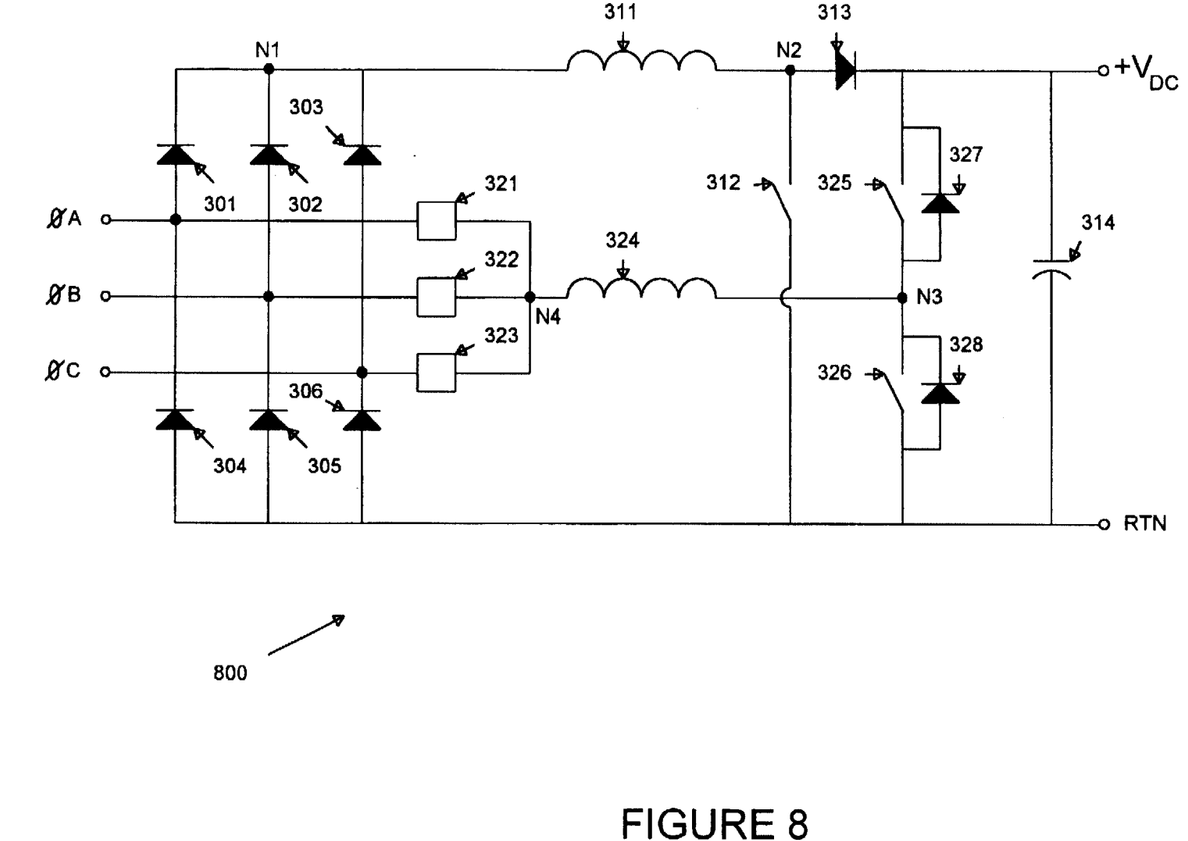
FIG. 8 illustrates a boost converter according to a fifth embodiment of the present invention.

FIG. 8 illustrates boost converter 800 according to a fifth embodiment of the present invention. This is a simple variation of boost converter 300 in FIG. 3, wherein switches 325 and 326 are moved to the other side of diode 313. In this embodiment, diodes 327 and 328 must be fast diodes and snubber circuits may be required. Since switches 325 and 326 are now on the same side of diode 313 as the large storage capacitor 314, switches 325 and 326 are never closed at the same time. Additionally, the gate drivers of switches 325 and 326 may require anti-shoot-through protection.

Figure 9:
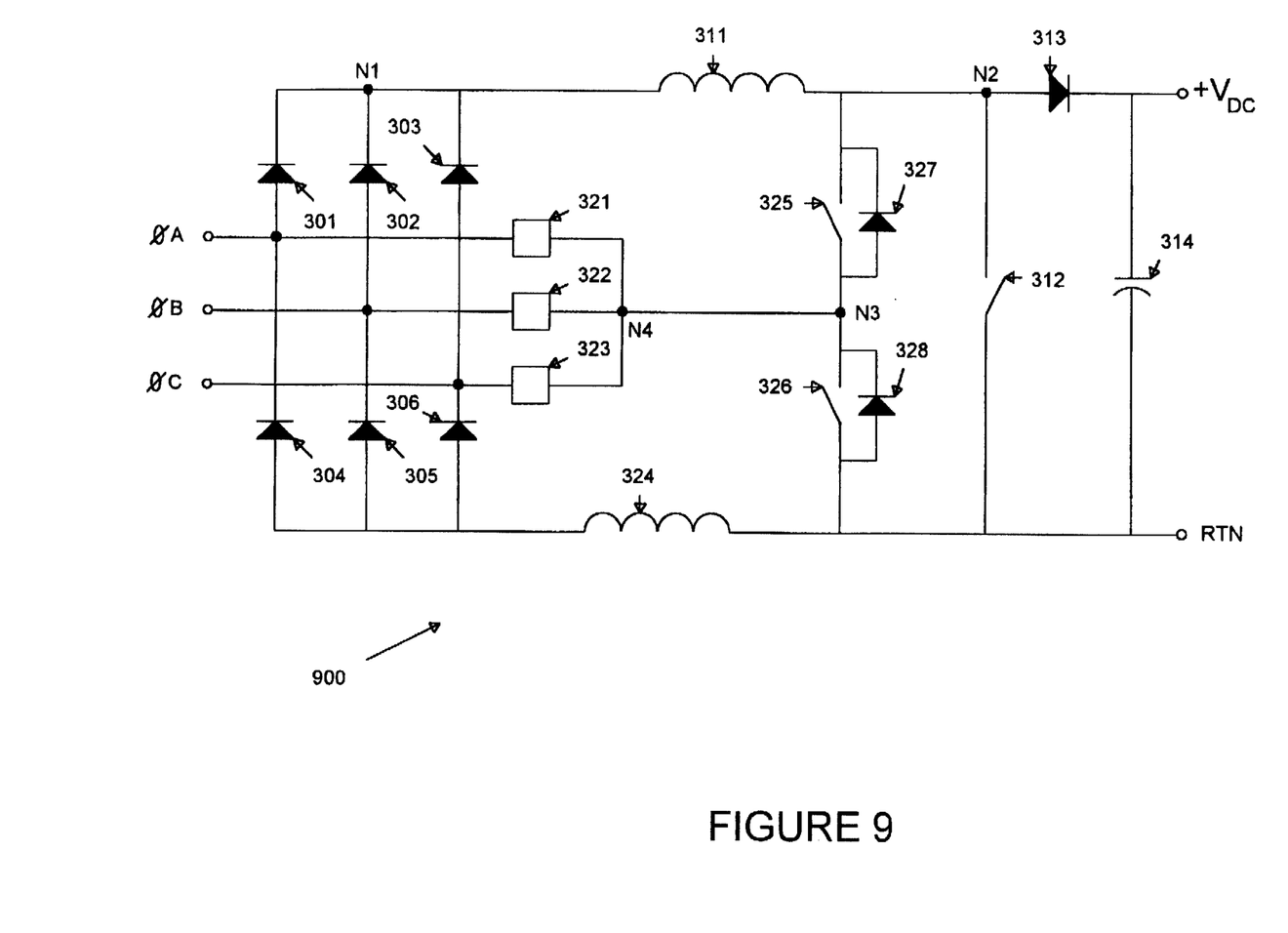
FIG. 9 illustrates a boost converter according to a sixth embodiment of the present invention.

FIG. 9 illustrates boost converter 900 according to a sixth embodiment of the present invention. Inductors may be put in any two of the three branches connecting diodes 301–306 and switches 321–323 to the high-frequency switching devices, switches 325, 326, 312, and diode 313. Inductor 324 is moved to the bottom branch, so that boost converter 900 contains inductors in the top and bottom branches. However, more printed wiring board area becomes EMI-noisy if an inductor is in the bottom branch, as in FIG. 9.

Figure 10:
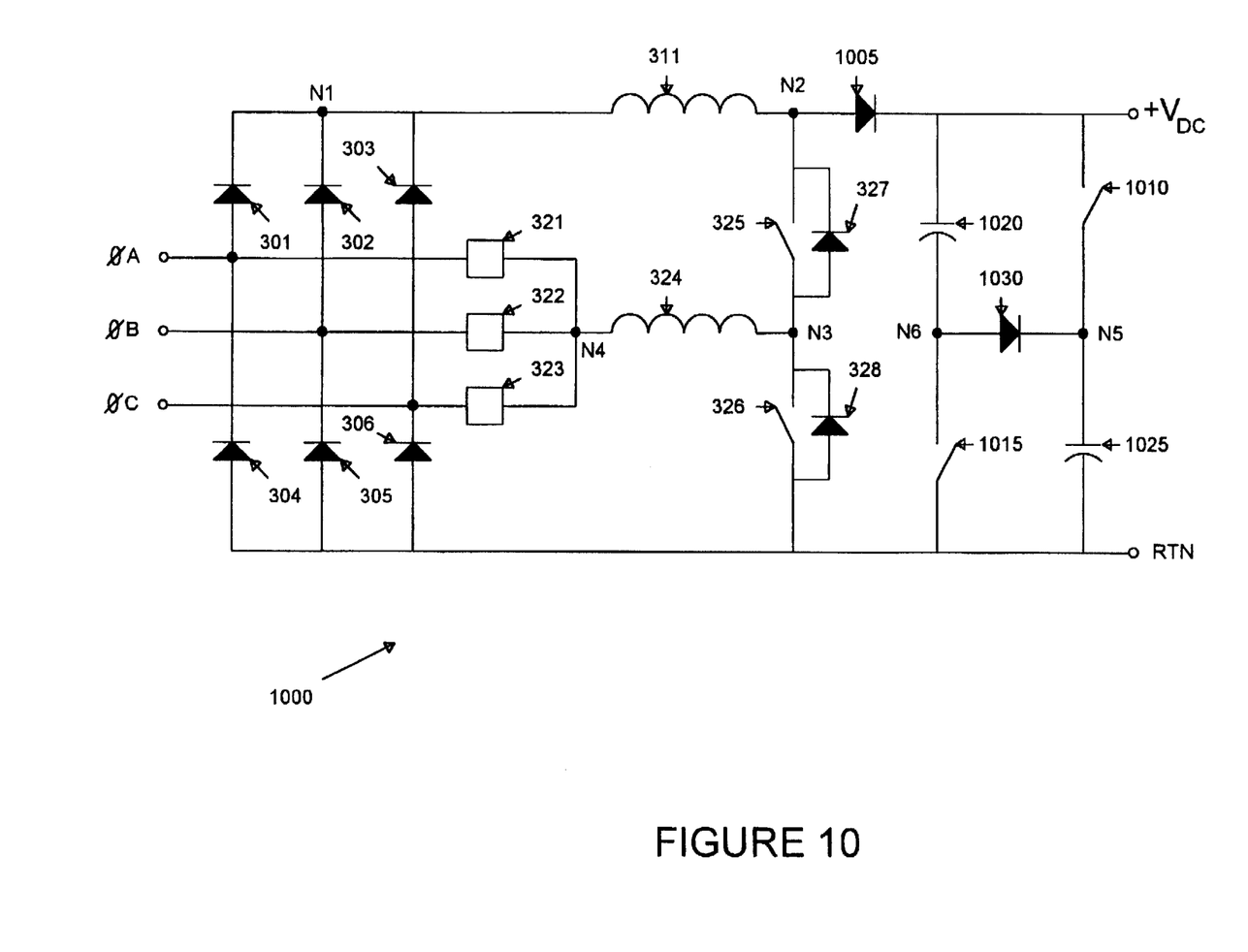
FIG. 10 illustrates a high power factor split-boost converter according to a seventh embodiment of the present invention.

FIG. 10 illustrates high-power factor split-boost converter 1000 according to a seventh embodiment of the present invention. For high AC input applications, such as 400 VRMS (phase-to-phase) inputs, the split boost converter is superior to boost converter 300. When switches 1010 and 1015 are closed, storage capacitors 1020 and 1025 are in parallel and are charged up through diode 1005. When switches 1010 and 1015 are opened, storage capacitors 1020 and 1025 are in series so that their voltages add together and current flows through diode 1030. Diode 1005 must be a fast diode in order to allow slow diodes to be used for diodes 327 and 328. If diode 1005 is not present, then diodes 327 and 328 must be fast recovery diodes and snubbers may be needed to limit losses associated with their reverse recovery.

Figure 11:
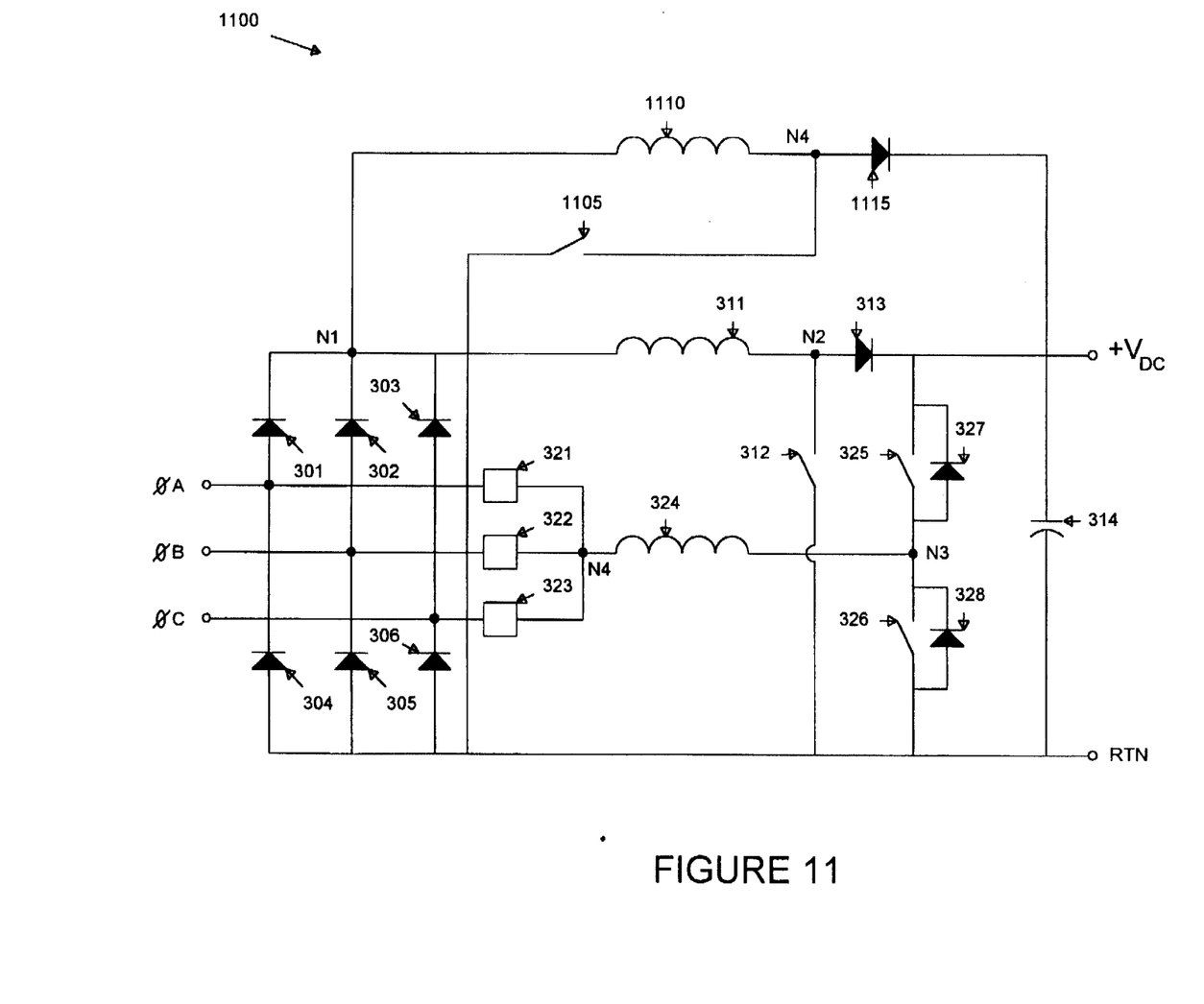
FIG. 11 illustrates an interleaved boost converter according to an eighth embodiment of the present invention.

FIG. 11 illustrates interleaved boost converter 1100 according to an eighth embodiment of the present invention. Boost converter 1100 is an interleaved version of boost converter 800 in FIG. 8, wherein switches 325 and 326 and diodes 327 and 328 are moved to the output side of boost diode 313. Pulse modulation switch 1105, inductor 1110 and boost diode 1115 form the second boost cell. For interleaving two boost cells with a common auxiliary network, switches 325 and 326 may be on either side of boost diode 313. However, for interleaving three or more boost cells with a single auxiliary network, switches 325 and 326 must be on the output side of boost diode 313.

Figure 12:
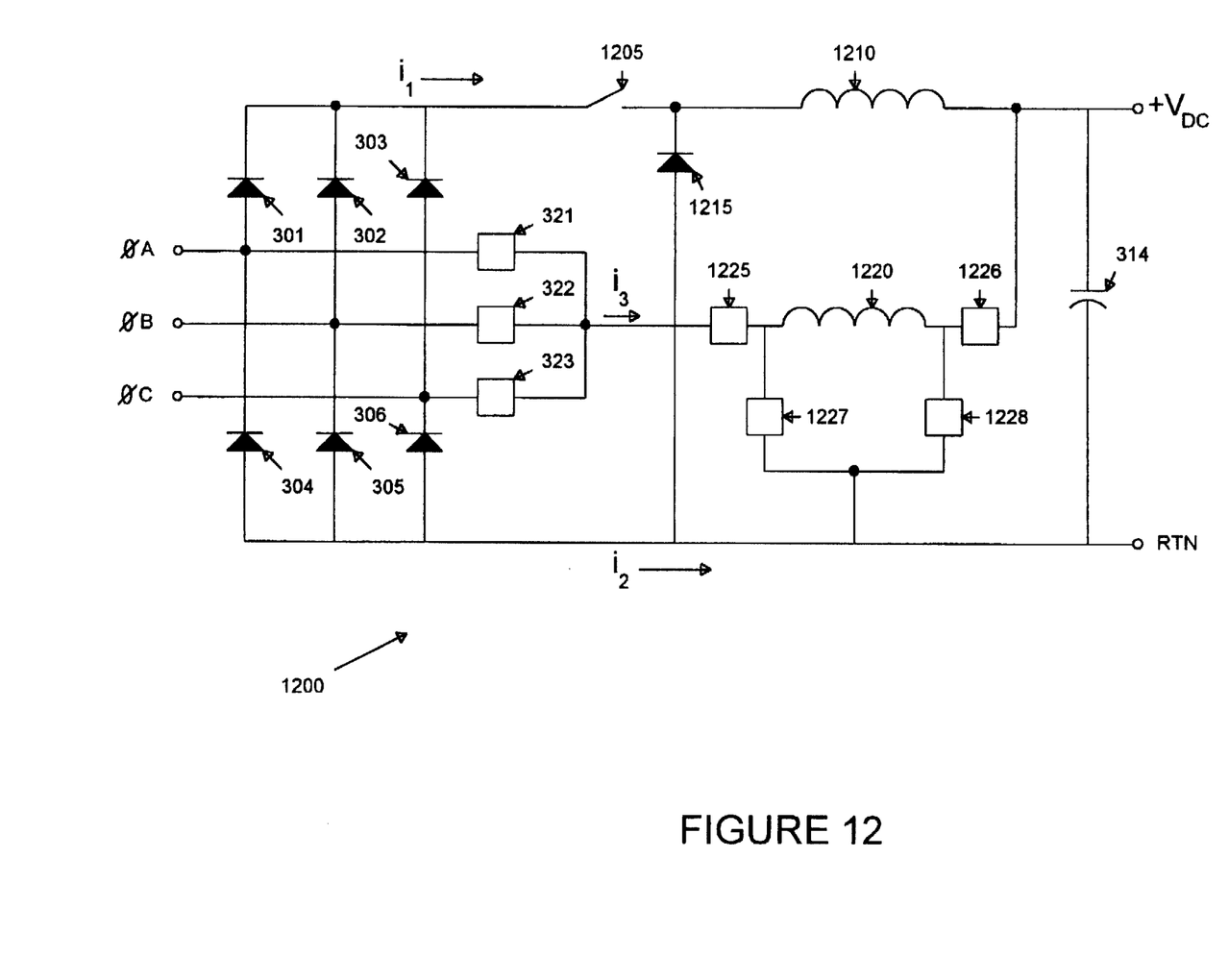
FIG. 12 illustrates a buck converter according to a ninth embodiment of the present invention.

FIG. 12 illustrates buck converter 1200 according to a ninth embodiment of the present invention. Buck converter 1200 is a DC converter that outputs a DC voltage level, $+V_{DC}$, that is less than the peak-to-peak amplitude between the three phases of the AC input supply. Switch 1205, inductor 1210 and diode 1215 correspond to main high-frequency PWM switching circuit 210 in FIG. 2B. Switches 1225–1228 and inductor 1220 correspond to auxiliary high-frequency PWM switching circuit 215 in FIG. 2B and are responsible for controlling and shaping the waveform of the return current $i_3$. Switches 321–323, which are bi-directional, correspond to low-frequency phase selection switching circuit 220 in FIG. 2B and connect inductor 1220 to the phase closest to neutral.

Although the present invention has been described in detail, those skilled in the art should understand that they can make various changes, substitutions and alterations herein without departing from the spirit and scope of the invention in its broadest form.

What is claimed is:

1. An active circuit for delivering three phase AC input power received from a three phase rectifier to a DC/DC converter, comprising:

a phase selection switching circuit, coupled to said rectifier, that selects an inner phase of said three phase AC input power; and a switching network, coupled to said phase selection switching circuit and said rectifier, that controls a waveshape of said inner phase and a waveshape of at least one other phase, thereby to reduce harmonics associated with said three phase AC input power.

2. The active circuit as recited in claim 1 wherein said DC/DC converter is embodied in first and second interleaved portions, said switching network delivering said inner phase to at least one of said first and second interleaved portions.

3. The active circuit as recited in claim 2 wherein said switching network delivers said inner phase to both said first and second interleaved portions.

4. The active circuit as recited in claim 1 wherein said switching network comprises at least two current control switches, said at least two current control switches controlling a current waveshape in said inner phase.

5. The active circuit as recited in claim 1 wherein said three phase rectifier comprises a pair of diodes for each phase of said three phase AC input power.

6. The active circuit as recited in claim 1 wherein said switching network comprises an inductor that delivers said inner phase to said DC/DC converter.

7. The active circuit as recited in claim 1 wherein said phase selection switching circuit is synchronized to said three phase AC input power.

8. For use in a DC/DC converter fed by a three phase rectifier, a method of delivering an inner phase of three phase AC input power provided to said rectifier, comprising the steps of:

selecting an inner phase of said three phase AC input power; and controlling a waveshape of said inner phase to said DC/DC converter thereby to reduce harmonics associated with said three phase AC input power.

9. The method as recited in claim 8 wherein said DC/DC converter is embodied in first and second interleaved portions, said step of delivering comprising the step of delivering said inner phase to at least one of said first and second interleaved portions.

10. The method as recited in claim 9 wherein said step of delivering comprises the step of delivering said inner phase to both said first and second interleaved portions.

11. The method as recited in claim 8 further comprising the step of operating at least two active switches within said DC/DC converter.

12. The method as recited in claim 8 wherein said three phase rectifier comprises a pair of diodes for each phase of said three phase AC input power.

13. The method as recited in claim 8 wherein said step of controlling comprises the step of controlling a current waveshape of said inner phase to said DC/DC converter in an inductor.

14. The method as recited in claim 8 further comprising the step of synchronizing said switching circuit controller to said three phase AC input power.

15. A power converter, comprising:

a three phase rectifier;

a DC/DC converter, coupled to said three phase rectifier, that receives rectified power therefrom; and an active circuit to deliver an inner phase of three phase AC input power provided to said rectifier, including:

a controller synchronized to voltages of said three phase AC input power, a phase selection switching circuit, coupled to said rectifier and said controller, that selects an inner phase of said three phase AC input power, and a switching network, coupled to said phase selection switching circuit, that controls a waveshape of said inner phase to said DC/DC converter thereby to reduce harmonics associated with said three phase AC input power.

16. The power converter as recited in claim 15 wherein said DC/DC converter is embodied in first and second interleaved portions, said switching network controlling a waveshape of said inner phase to at least one of said first and second interleaved portions.

17. The power converter as recited in claim 16 wherein said switching network controls a waveshape of said inner phase to both said first and second interleaved portions.

18. The power converter as recited in claim 15 wherein said switching network comprises at least two active switches, said at least two active switches acting as switches within said DC/DC converter.

19. The power converter as recited in claim 15 wherein said three phase rectifier comprises a pair of diodes for each phase of said three phase AC input power.

20. The power converter as recited in claim 15 wherein said phase selection switching circuit comprises an inductor that delivers said inner phase to DC/DC converter.

* * * * *